(12) United States Patent
Watanabe et al.

(10) Patent No.: US 9,676,933 B2
(45) Date of Patent: Jun. 13, 2017

(54) MOISTURE-CURING COMPOSITION

(71) Applicant: Three Bond Fine Chemical Co., Ltd., Sagamihara-shi, Kanagawa (JP)

(72) Inventors: Yosuke Watanabe, Sagamihara (JP); Hiroki Sadanaga, Sagamihara (JP); Akihiro Koyama, Sagamihara (JP)

(73) Assignee: Three Bond Fine Chemical Co., Ltd., Sagamihara-shi, Kangawa (JP)

( * ) Notice: Subject to any disclaimer, the term of this patent is extended or adjusted under 35 U.S.C. 154(b) by 0 days.

(21) Appl. No.: 14/908,931

(22) PCT Filed: Jul. 7, 2014

(86) PCT No.: PCT/JP2014/068082
§ 371 (c)(1),
(2) Date: Jan. 29, 2016

(87) PCT Pub. No.: WO2015/016010
PCT Pub. Date: Feb. 5, 2015

(65) Prior Publication Data
US 2016/0160035 A1 Jun. 9, 2016

(30) Foreign Application Priority Data
Jul. 31, 2013 (JP) ................................. 2013-158801

(51) Int. Cl.
| | | |
|---|---|---|
| *C08L 43/04* | (2006.01) | |
| *C09K 3/10* | (2006.01) | |
| *C08L 83/10* | (2006.01) | |
| *C09J 143/04* | (2006.01) | |
| *C09J 4/00* | (2006.01) | |
| C08K 5/5415 | (2006.01) | |
| C08K 5/544 | (2006.01) | |
| C08G 77/14 | (2006.01) | |
| C08G 77/44 | (2006.01) | |

(52) U.S. Cl.
CPC ............. *C08L 43/04* (2013.01); *C08L 83/10* (2013.01); *C09J 4/00* (2013.01); *C09J 143/04* (2013.01); *C09K 3/1018* (2013.01); C08G 77/14 (2013.01); C08G 77/44 (2013.01); C08K 5/544 (2013.01); C08K 5/5415 (2013.01); C09K 2003/1056 (2013.01); C09K 2200/0685 (2013.01)

(58) Field of Classification Search
None
See application file for complete search history.

(56) References Cited

U.S. PATENT DOCUMENTS

| | | | |
|---|---|---|---|
| 5,399,601 A | 3/1995 | Kusumi et al. | |
| 8,729,179 B1 * | 5/2014 | Klemarczyk | C08F 8/42 524/588 |
| 2005/0234144 A1 * | 10/2005 | Bachon | C08G 18/289 521/137 |
| 2008/0076878 A1 * | 3/2008 | Wakioka | C08G 65/336 525/190 |
| 2012/0053296 A1 * | 3/2012 | Coffey | C08F 8/00 525/100 |
| 2012/0065308 A1 * | 3/2012 | Sumi | C08L 83/04 524/139 |

FOREIGN PATENT DOCUMENTS

| | | |
|---|---|---|
| JP | A-H06-145453 | 5/1994 |
| JP | A-H07-048540 | 2/1995 |
| JP | A-2001-011321 | 1/2001 |
| JP | A-2010-047638 | 3/2010 |
| WO | WO2006/129670 A1 | 7/2006 |

OTHER PUBLICATIONS

International Preliminary Report on Patentability dated Feb. 11, 2016, issued in PCT Application No. PCT/JP2014/068082, incl. Eng. Translation.
International Search Report issued in PCT Application No. PCT/JP2014/068082, mailed Sep. 16, 2014, incl. Eng. Translation.

* cited by examiner

*Primary Examiner* — Robert S Loewe
(74) *Attorney, Agent, or Firm* — Dickinson Wright PLLC

(57) ABSTRACT

Regarding a durability test of a moisture-curing composition, it is difficult to both suppress foaming in the inside of a cured product and to stably maintain the physical properties of a cured product.
A moisture-curing composition containing the components (A) to (D), the moisture-curing composition containing 0.5 to 5.0 parts by mass of the component (C) relative to 100 parts by mass of the component (A):
Component (A): an oligomer which has a polymer of (meth)acrylic monomers as a main chain and which has a hydrolyzable silyl group in the molecule
Component (B): specific polydialkylsiloxane
Component (C): silicate
Component (D): a curing catalyst.

11 Claims, No Drawings

MOISTURE-CURING COMPOSITION

TECHNICAL FIELD

The present invention relates to a moisture-curing composition with excellent heat resistance and oil resistance.

BACKGROUND ART

A silicone composition polymerized by a chemical reaction which is caused by moisture in the air is well known, and it is used for a sealing agent, an adhesive agent, a coating agent, and a potting agent. By containing a silicon atom with a hydrolyzable functional group, the silicone composition forms a siloxane bond which is caused by moisture in the air. Accordingly, since the composition is cured upon exposure to the air after coating an adhesive agent, it does not require energy like heating or light irradiation and is advantageous from the viewpoint of environment and cost.

Meanwhile, so-called modified silicone such as a vinyl-based polymer with a silicon having a hydrolyzable functional group at the end, is also used as a moisture-curing resin.

Thus, a vinyl-based polymer having at least one cross-linkable silyl group (hydrolyzable group) is known, and use of (meth)acrylic acid or (meth)acrylate ester as a vinyl-based polymer is known, in particular. Furthermore, according to the technique described in JP 2001-011321 A, by adding to a vinyl-based polymer dimethylpolysiloxane having a cross-linkable silyl group at the end, surface tack of a cured product can be lowered. In this regard, it is believed that, because only a soft cured product is obtained from a vinyl polymer alone, an effect of improving the surface curability can be obtained by adding, as a measure to deal with the problem, cross-linkable dimethylpolysiloxane. Furthermore, although it is described in JP 2001-011321 A that the cured state on a surface of a cured product can be improved, there are no descriptions at all regarding the physical properties of a cured product and it is only described to have heat resistance. As such, although there is no mention in JP 2001-011321 A regarding durability of various physical properties (e.g., hardness, tensile strength, or the like), from the viewpoint of practical use like mounting in a vehicle or the like, further improvement of the durability of various physical properties is required.

In this regard, as a well-known problem of a de-alcohol type moisture-curing composition, it is known that foaming is caused, during an durability test involved with exposure to high temperature (atmosphere with 150° C.), by alcohol accumulated in the inside, which is generated from a cross-linkable silyl group. In particular, when a composition is introduced by potting (resin coating) or the like, there is a tendency that foaming is caused by residual alcohol after durability test. There is a problem that foaming of a cured product leads to cracking or fracture, yielding a possibility of having a great loss of oil resistance or sealing property.

SUMMARY OF INVENTION

As described above, according to the technique of a related art, it is difficult, in the durability test of a moisture-curing composition, to suppress foaming in the inside of a cured product and also to stably maintain the physical properties of a cured product that is obtained from the moisture-curing composition. More specifically, there has been a problem that the physical properties like hardness, tensile strength, elongation rate, and tensile shear adhesion force of a cured product are deteriorated over the time. As such, the moisture-curing composition based on the technique of a related art is insufficient from the viewpoint of durability under harsh environmental condition which requires not only the heat resistance but also oil resistance for use like a mounting in a vehicle.

Accordingly, an object of the present invention is to provide a moisture-curing composition capable of suppressing over-time deterioration of physical property of a cured product, by suppressing foaming in the inside of a cured product to be obtained. Another object of the present invention is to provide an adhesive, a sealing agent, and a potting agent with suppressed over-time deterioration, by using the moisture-curing composition.

Accordingly, the inventors of the present invention conducted intensive studies to achieve the object described above, and completed the present invention relating to a moisture-curing composition.

Summary of the present invention is described hereinbelow. According to an embodiment of the present invention, a moisture-curing composition includes the components (A) to (D) in which the component (C) is contained at 0.5 to 5.0 parts by mass relative to 100 parts by mass of the component (A).

Component (A): an oligomer which has a polymer of (meth)acrylic monomers as a main chain and which has a hydrolyzable silyl group in the molecule
Component (B): polydialkylsiloxane of general formula 1
Component (C): silicate
Component (D): a curing catalyst

DESCRIPTION OF EMBODIMENTS

The moisture-curing composition of the present invention allows both suppressing the foaming in the inside of a cured product and stable maintaining of the physical property of a cured product in heat resistance/oil resistance test as a durability test of a moisture-curing composition.

Hereinbelow, details of the present invention are described. The component (A) which can be used for the present invention is an oligomer which has a polymer of (meth)acrylic monomer as a main chain and has a hydrolyzable silyl group in the molecule. As described herein, the hydrolyzable silyl group is a general name of a functional group in which an alkoxy group is substituted to silicon. The hydrolyzable silyl group is included in the component (A), and it can be present at any position like side chain and/or end of a molecule. However, from the viewpoint of rubber elasticity and flexibility, it is preferably present at both ends of a main chain. In that case, although it is possible that one or more hydrolyzable silyl group is substituted on each of the two ends of a main chain, it is preferable that one hydrolyzable silyl group is present at each end. Namely, according to another embodiment of the present invention, a moisture-curing composition, in which the component (A) is an oligomer having one hydrolyzable silyl group at each end of the main chain, is provided.

The hydrolyzable silyl group is a functional group in which an alkoxy group is substituted to silicon, as described above. It is preferable that an alkoxy group with 1 to 20 carbon atoms is substituted. It is more preferable that an alkoxy group with 1 to 10 carbon atoms is substituted. It is even more preferable that an alkoxy group with 1 to 5 carbon atoms is substituted.

Specific examples of the hydrolyzable silyl group include a trimethoxysilyl group, a triethoxysilyl group, a triisopropoxysilyl group, and a tri-n-propoxysilyl group, but it is not limited thereto.

Furthermore, as described herein, the "oligomer" indicates a product in which 2 to 1500 (meth)acrylic monomers are polymerized.

As for the (meth)acrylic monomer constituting the main chain of the component (A), it is not particularly limited and various types can be used. The (meth)acrylic monomer is a general name of a monomer having an acrylic group or a methacrylic group. Examples thereof include (meth)acrylic acid, methyl (meth)acrylate, ethyl (meth)acrylate, (meth)acrylate ester, n-propyl (meth)acrylate, isopropyl (meth)acrylate, n-butyl (meth)acrylate, isobutyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perflurobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadecylethyl (meth)acrylate, but not limited thereto. In the present invention, it is possible to polymerize a monomer selected from the above (meth)acrylic monomers. However, a (meth)acrylic monomer with a hydrocarbon group is preferably selected.

The lower limit of the number average molecular weight (Mn) of the component (A) is preferably 500, and more preferably 3000. The upper limit of the number average molecular weight (Mn) of the component (A) is preferably 100,000 and more preferably 50,000. Namely, as described herein, the "oligomer" includes a molecule of which the number average molecular weight is within the above range. When the number average molecular weight is 500 or more, there is a tendency that the elasticity of a cured product of the composition is easily exhibited. On the other hand, when it is 100,000 or less, the viscosity can be maintained at suitable level so that stringy elongation during application of the composition, which is caused by excessively high viscosity, can be suppressed. Meanwhile, for the "number average molecular weight (Mn)" described herein, a value calculated by measurement using gel permeation chromatography (GPC) is adopted. At that time, tetrahydrofuran is used as a solvent and polystyrene is used as a reference material.

The component (A) can be obtained by various polymerization methods, and the method is not particularly limited. However, from the viewpoint of availability of a monomer and easiness of controlling the reaction, a radical polymerization method is preferable. Among radical polymerizations, a controlled radical polymerization is preferable. A living radical polymerization is more preferable, and an atom radical transfer polymerization is particularly preferable. Furthermore, a method for introducing a (meth)acrylic group to a main chain of a polymer of (meth)acrylic monomer is a well-known method, and the method is described in JP 09-272714 A (US 2002/0177670 A1), JP 11-043512 A, or the like.

The component (B) of the present invention is polydialkylsiloxane with the following general formula 1. Non-modified polydialkylsiloxane and/or epoxy-modified polydialkylsiloxane are also encompassed by the polydialkylsiloxane. As described herein, the epoxy-modified polydialkylsiloxane encompasses polydialkylsiloxane having an organic group including an epoxy group introduced to aside chain of polysiloxane (side chain type), polydialkylsiloxane having an organic group including an epoxy group introduced to both ends of polysiloxane (both ends type), polydialkylsiloxane having an organic group including an epoxy group introduced to one end of polysiloxane (one end type), polydialkylsiloxane having an organic group including an epoxy group introduced to a side chain and both ends of polysiloxane (side chain and both ends type), and polydialkylsiloxane having an organic group including an epoxy group introduced to a side chain and one end of polysiloxane (side chain and one end type).

As for the non-modified polydialkylsiloxane, it preferably has kinematic viscosity (25° C.) of 10 to 10000 mm$^2$/s, and more preferably 50 to 1000 mm$^2$/s.

As for the epoxy-modified polydialkylsiloxane, it preferably has kinematic viscosity (25° C.) of 5 to 2000 mm$^2$/s, and more preferably 10 to 1800 mm$^2$/s.

Meanwhile, the aforementioned kinematic viscosity indicates the measurement value of polydialkylsiloxane before being prepared into a composition (In other words, at a stage before mixing with other constitutional components). Measurement of the kinematic viscosity can be performed by using Ubbelohde viscometer manufactured by SIBATA SCIENTIFIC TECHNOLOGY LTD., for example.

As for the epoxy-modified polydialkylsiloxane, the functional group equivalent is preferably 100 to 10000 g/mol, more preferably 200 to 1000 g/mol, particularly preferably 300 to 600 g/mol. When the kinematic viscosity is equal to or higher than the lower limit of kinematic viscosity, it is not likely to cause a bleed-out from a cured product during curing. When the kinematic viscosity is equal to or lower than the upper limit of kinematic viscosity, it is not likely that the separation between the component (A) and the component (B) occurs in the composition.

Preferred examples of the polydialkylsiloxane as the component (B), which can be used in the present invention, include polydimethylsiloxane (siloxanes having 2 methyl groups substituted on a silicon atom). Furthermore, the polydimethylsiloxane is preferably non-modified polydimethylsiloxane (straight silicone oil) and/or epoxy-modified polydimethylsiloxane. The combination of several components (B) of different type or different molecular weight may be used.

As for the non-modified polydimethylsiloxane, it preferably has kinematic viscosity (25° C.) of 10 to 10000 mm$^2$/s, and more preferably 50 to 1000 mm$^2$/s. As for the epoxy-modified polydimethylsiloxane, it preferably has kinematic viscosity (25° C.) of 5 to 2000 mm$^2$/s, and more preferably 10 to 1800 mm$^2$/s. Meanwhile, the aforementioned kinematic viscosity indicates the measurement value of polydimethylsiloxane before being prepared into a composition (In other words, at a stage before mixing with other constitutional components). Measurement of the kinematic viscosity can be performed by using Ubbelohde viscometer manufactured by SIBATA SCIENTIFIC TECHNOLOGY LTD., for example. Furthermore, as for the epoxy-modified polydimethylsiloxane, the functional group equivalent is preferably 100 to 10000 g/mol, more preferably 200 to 1000 g/mol, particularly preferably 300 to 600 g/mol. When the kinematic viscosity is equal to or higher than the lower limit of kinematic viscosity, it is not likely to cause a bleed-out from a cured product during curing. When the kinematic viscosity is equal to or lower than the upper limit of kinematic viscosity, it is not likely that the separation between the component (A) and the component (B) occurs in the composition.

The weight average molecular weight (Mw) of the polydialkylsiloxane is a value which can be determined based on the kinematic viscosity (25° C.). It is preferable that the weight average molecular weight (Mw) of the polydialkylsiloxane used in the present invention is a value which is determined based on the above-mentioned preferred range of the kinematic viscosity (25° C.).

Namely, the non-modified polydialkylsiloxane preferably has weight average molecular weight which corresponds to kinematic viscosity (25° C.) of 10 to 10000 mm²/s. It more preferably has weight average molecular weight which corresponds to kinematic viscosity (25° C.) of 50 to 1000 mm²/s.

Furthermore, the epoxy-modified polydialkylsiloxane preferably has weight average molecular weight which corresponds to kinematic viscosity (25° C.) of 5 to 2000 mm²/s. It more preferably has weight average molecular weight which corresponds to kinematic viscosity (25° C.) of 10 to 1800 mm²/s.

Meanwhile, the relationship between the weight average molecular weight and kinematic viscosity (25° C.) of the polydialkylsiloxane described herein is represented by the following formula (A. Kolorlov's formula).

$$[\eta]=2.15\times10^{-4}Mw^{0.65} \quad \text{[Math. 1]}$$

Mw: Weight average molecular weight, [η]: Kinematic viscosity (25° C.)

Furthermore, when the functional group equivalent is 100 g/mol or more, a change rate after a durability test can be kept at low level. When it is 10000 g/mol, the moisture-curing composition to be obtained can maintain co-solubility as a whole, and therefore preferable. As described herein, the "functional group equivalent" indicates a substance amount of a compound per mole of a functional group, and it is expressed in "g/mol." It is obtained by a ratio between a peak (area) of a functional group and a peak (area) of silicone based on a structure estimated from peaks that are measured by nuclear magnetic resonance spectrum (NMR).

[Chem. 1]

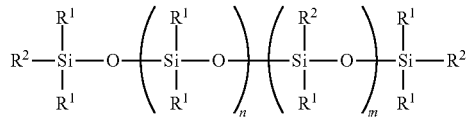

Formula 1 n is an integer of 1 or more, m is an integer of 0 or more, $R^1$ each independently represents any one of a methyl group, an ethyl group, and a propyl group, and $R^2$ each independently represents $R^1$ or an organic group having an epoxy group. Meanwhile, as described herein, the "organic group having an epoxy group" includes a substituent group like a glycidyl group. Furthermore, examples of the "organic group" include, although it is not particularly limited if it contains a carbon atom, a monovalent substituent group like an alkyl group with 1 to 20 carbon atoms, an alkenyl group with 2 to 20 carbon atoms, an alkynyl group with 2 to 20 carbon atoms, a cycloalkyl group with 3 to 20 carbon atoms, and an aryl group with 6 to 20 carbon atoms.

In the above formula 1, the upper limit of n and m can be a value which corresponds to the weight average molecular weight of the polydialkylsiloxane of the formula 1. Herein, because the weight average molecular weight is related to the kinematic viscosity (25° C.), the values of n and m can be determined based on the kinematic viscosity (25° C.)

More specifically, when the polydialkylsiloxane of the formula 1 is non-modified polydialkylsiloxane, m is 0 and n is determined based on the value of the kinematic viscosity (25° C.). In that case, n is preferably a number which corresponds to the kinematic viscosity (25° C.) of 10 to 10000 mm²/s. It is more preferably a number which corresponds to the kinematic viscosity (25° C.) of 50 to 1000 mm²/s.

Furthermore, when the polydialkylsiloxane of the formula 1 is epoxy-modified polydialkylsiloxane (in the formula 1 above, at least one of $R^2$ is an organic group having an epoxy group), sum of the n and m (n+m) is determined based on the value of the kinematic viscosity (25° C.) and the value of m is determined based on the value of the functional group equivalent. In that case, it is preferable that the sum of n and m is a value which corresponds to the kinematic viscosity (25° C.) of 5 to 2000 mm²/s. It is more preferable that the sum of n and m is a value which corresponds to the kinematic viscosity (25° C.) of 10 to 1800 mm²/s. Furthermore, it is preferable that the value of m is a number which corresponds to the functional group equivalent of 100 to 10000 g/mol. It is more preferably a number which corresponds to the functional group equivalent of 200 to 1000 g/mol. It is particularly more preferably a number which corresponds to the functional group equivalent of 300 to 600 g/mol.

Furthermore, $R^1$ is preferably a methyl group. $R^2$ is preferably a methyl group or an organic group having an epoxy group. Furthermore, it is preferable that any one of $R^1$ and $R^2$ is a methyl group.

Specific examples of the non-modified polydimethylsiloxane include KF-96 series manufactured by Shin-Etsu Chemical Co., Ltd. and TSF451 series manufactured by Momentive Performance Materials Inc., but not limited thereto. Furthermore, the above compound may be used either singly or in combination of two or more types.

As for the specific examples of the epoxy-modified polydimethylsiloxane, examples of the side chain type include KF-101, KF-1001, and X-22-343 manufactured by Shin-Etsu Chemical Co., Ltd., examples of the both ends type include KF-105 and X-22-163 series manufactured by Shin-Etsu Chemical Co., Ltd., examples of the single end type include X-22-173DX, and examples of the side chain both ends type include X-22-9002 manufactured by Shin-Etsu Chemical Co., Ltd., but not limited thereto. Furthermore, the above compound may be used either singly or in combination of two or more types.

From the viewpoint of improving various physical properties of the composition, the epoxy-modified polydialkylsiloxane is preferred as the component (B). The epoxy-modified polydimethylsiloxane is particularly preferable. Meanwhile, from the viewpoint of suppressing the cost, the non-modified polydialkylsiloxane is preferable and the non-modified polydimethylsiloxane is particularly preferable.

It is preferable for the component (B) to be added in an amount of 5 to 40 parts by mass relative to 100 parts by mass of the component (A). More preferably, it is 10 to 30 parts by mass. Particularly preferably, it is 15 to 25 parts by mass. When the component (B) is 5 parts by mass or more, a change rate can be small after the durability test. When it is 40 parts by mass or less, it is not likely to cause a bleed-out of the component (B) from a cured product.

The component (C) which may be used in the present invention is silicate (polysilicate). Specifically, it is preferably a compound represented by the following general formula 2. Thus, according to another embodiment of the present invention, a moisture-curing composition in which the component (C) contains the general formula 2 is provided.

[Chem. 2]

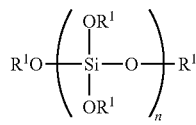

Formula 2 n is an integer of 1 to 10 and $R^1$ each independently represents any one of a methyl group, an ethyl group, and a propyl group.

Furthermore, considering the co-solubility, n in the formula 2 is preferably 1 to 8, and more preferably 1 to 5. Furthermore, $R^1$ is preferably an ethyl group.

The polysilicate represented by the above formula 2 is a condensation product of an alkyl silicate, which is an alkoxysilane oligomer derived from tetraalkoxysilane as a starting material. The method for producing it is not particularly limited. Specific examples of the polysilicate include methyl polysilicate and ethyl polysilicate, but not limited thereto. The polysilicate may be used either singly or in combination of two or more types.

The component (C) is contained in an amount of 0.5 to 5.0 parts by mass relative to 100 parts by mass of the component (A). When it is less than 0.5 part by mass, the cured product may easily have foaming after the durability test. On the other hand, when it is more than 5.0 parts by mass, a poor curing property at deep-section is yielded. Furthermore, from the viewpoint of minimizing the change rate of various physical properties, it is preferable for the component (C) to be contained in an amount of 0.5 to 4.0 parts by mass relative to 100 parts by mass of the component (A), more preferably 0.5 to 3.0 parts by mass, particularly preferably 0.5 to 2.0 parts by mass.

The component (D) which may be used in the present invention is a catalyst for curing the composition. It is sufficient for the curing catalyst to have an activity of accelerating de-alcohol condensation between the components (A) each other, the component (A) and the component (E) described below, and the components (E) each other. It is particularly preferably an organometallic catalyst. Specific examples of the curing catalyst include organo tin catalyst, an organo titanium catalyst, and an organo zirconium catalyst. However, from the viewpoint of diversity, reactivity, and cost of the catalyst type which can be used, it is preferably an organo titanium catalyst or an organo tin catalyst. Furthermore, from the viewpoint of curing property, an organo tin catalyst is most preferable. Namely, according to another embodiment of the present invention, a moisture-curing composition in which the component (D) is an organo tin catalyst is provided. Furthermore, according to another embodiment of the present invention, a moisture-curing composition in which the component (D) is an organo titanium catalyst is provided.

As for the specific examples of the tin catalyst, examples of a divalent organo tin catalyst include tin octylate and tin naphthenate, examples of a tetravalent organo tin compound include dibutyl tin dioctoate, dibutyl tin dilaurate, dibutyl tin diacetate, dibutyl tin dimaleate, dibutyl tin di stearate, dioctyl tin dilaurate, dioctyl tin diversatate, dibutyl tin oxide, dibutyl tin bis(triethoxysilicate), and the combination of dibutyl tin oxide and phthalate ester, and examples of a chelate tin compound include a tin-based chealte compound like dibutyl tin bis(acetylacetonate), but not limited thereto. Examples of the organo titanium catalyst include tetraisopropyl titanate, tetranormalbutyltitanate, butyl titanate dimer, tetraoctyl titanate, titanium acetylacetonate, titanium octylene glycolate, titanium tetraacetylacetonate, titanium ethylacetoacetate, polyhydroxytitanium stearate, titanium lactate, and titanium triethanol aminate, but not limited thereto. Specific examples of the organo zirconium catalyst include tetranormalpropoxy zirconium, tetranormalbutoxy zirconium, zirconium tetraacetylacetonate, zirconium monobutoxyacetylacetonate bis(ethylacetoacetate), zirconium dibutoxybis(ethylacetoacetate), zirconium tetraacetylacetonate, and zirconium tributoxystearate, but not limited thereto. The curing catalyst may be used either singly or in combination of two or more types.

The component (D) is preferably added in an amount of 0.1 to 10 parts by mass relative to 100 parts by mass of the component (A). More preferably, it is 1 to 8 parts by mass. Particularly preferably, it is 1 to 5 parts by mass. When it is 0.1 part by mass or more, a stable moisture-curing property can be obtained. When it 10 parts by mass or less, the storage stability can be maintained.

The moisture-curing composition according to the present invention may preferably contain, in addition to the components (A) to (D) described above, the following compound as another component (component (E)).

The component (E) which may be used in the present invention is preferably a silane-based coupling agent having an amino group ($-NH_2$). Specifically, according to another embodiment of the present invention, a moisture-curing composition further containing a silane-based coupling agent with an amino group as the component (E) is provided.

The component (E) may be used either singly or in combination of two or more components. Specific examples of the component (E) include N-2-aminoethyl-3-aminopropylmethyldimethoxysilane, N-2-aminoethyl-3-aminopropyltrimethoxysilane, N-2-aminoethyl-3-aminopropyltriethoxysilane, 3-aminopropyltrimethoxysilane, and 3-aminopropyltriethoxysilane, but not limited thereto. Examples of the raw materials include KBM-602, KBM-603, KBE-603, KBM-903, KBE-903 or the like that are manufactured by Shin-Etsu Chemical Co., Ltd.

It is also possible to use in combination of a coupling agent other than the component (E), and examples thereof include a silane-based coupling agent which has an alkyl group, a phenyl group, an epoxy group, a styryl group, a vinyl group, or a (meth)acrylic group as well as a hydrolyzable silane group. Specific examples of the silane-based coupling agent include methyl trimethoxysilane, allyl trimethoxysilane, vinyltrimethoxysilane, 3-glycidyoxypropyl trimethoxysilane, 3-methacryloxypropyl trimethoxysilane, 3-acryloxypropyl trimethoxysilane, and 3-chloropropyl trimethoxysilane, but not limited thereto. Specific examples of a commercially available product include KBM-13, KBM-103, KBM-1003, KBE-1003, KBM-303, KBM-403, KBE-402, KBE-403, KBM-1403, KBM-502, KBM-503, KBE-502, KBE-503, KBM-5103, KBM-802, KBM-803, and KBE-9007 that are manufactured by Shin-Etsu Chemical Co., Ltd., but not limited to them.

The component (E) is preferably added in an amount of 0.1 to 10 parts by mass relative to 100 parts by mass of the component (A). When the component (E) is 0.1 part by mass or more, the adhesion property is stabilized. When the component (E) is 10 parts by mass or less, the storage stability is improved. The silane coupling agent other than the component (E) is also preferably added in an amount of 0.1 to 10 parts by mass relative to 100 parts by mass of the component (A).

According to the present invention, fumed silica may be added for the purpose of controlling the viscosity. Examples thereof include a hydrophilic type having silanol remained on a non-treated surface and a hydrophobic type of which silica surface is hydrophobicized by treating the silanol with dimethyl dichlorosilane or the like, but not limited thereto. Specific examples of the hydrophilic type include AEROSIL 90, 130, 150, 200, 255, 300, and 380 manufactured by Nippon Aerosil Co., Ltd. Specific examples of the hydrophobic type include Aerosil R972 (treated with dimethylchlorosilane), R974 (added with dimethyldichlorosilane), R104 (treated with octamethylcyclotetrasiloxane), R106 (treated with octamethylcyclotetrasiloxane), R202 (treated with polydimethylsiloxane), R805 (treatedwithoctylsilane), R812 (treated with hexamethyldisilazane), R816 (treated with hexadecylsilane), and R711 (treated with methacrylsilane) manufactured by Nippon Aerosil Co., Ltd. Further examples include CAB-O-SIL series, which is fumed silica manufactured by Cabot Corporation.

It is preferable that the fumed silica is added in an amount of 0.1 to 10 parts by mass relative to 100 parts by mass of the component (A). When the fumed silica is 0.1 part by mass or more, it is preferable in that the flowablity can be suppressed (it is not likely to have a flow). When the fumed silica is 10 parts by mass or less, it is preferable in that, as the thixotropic property (a property having low viscosity under stirring but high viscosity after stopping the stirring) is provided, a good handling property during coating can be obtained.

Furthermore, depending on a purpose, an anti-oxidant may be added, and specific examples thereof include a phenol-based anti-oxidant, a thioether-based anti-oxidant, a phosphorus-based anti-oxidant, and a nitroxide-based anti-oxidant, but not limited thereto.

In order to control the properties to the extent that the characteristics of the present invention or physical properties of a cured product are not impaired, it is also possible to blend an additive including an organic filler such as (meth) acrylic polymer particles or polystyrene particles, an inorganic filler such as silicon oxide or calcium carbonate, an agent for controlling physical properties, a solvent, and a photostabilizer.

By having excellent durability, the moisture-curing composition according to the present invention can be also used as an adhesive for an electronic device component which is used for electronic devices for industrial or household use. Namely, according to another embodiment of the present invention, an adhesive consisting of the above moisture-curing composition is provided.

Furthermore, the moisture-curing composition of the present invention is preferably used in a part in which heat resistance and oil resistance are required, in particular, use for mounting in a vehicle or the like. Examples of such part include an engine, a transmission, and a differential gear. Examples of the oil include engine oil, gear oil, and automatic transmission oil. According to contact with oil at high temperature, cracking, fracture, expansion or the like may occur in a cured product to cause a deterioration of a sealing property. As a result, there may be a chance of having oil leakage. However, the moisture-curing composition of the present invention has resistance regarding the above required characteristics, and therefore is appropriate for use in sealing oil. Thus, according to another embodiment of the present invention, a sealing agent consisting of the above moisture-curing composition is provided.

Furthermore, since the moisture-curing composition of the present invention has suppressed foaming, it is also useful as a potting agent. Thus, according to another embodiment of the present invention, a potting agent consisting of the above moisture-curing composition is also provided.

EXAMPLES

Next, the present invention is described in greater detail in view of the examples, but the present invention is not limited those examples.

Examples 1 to 4 and Comparative Examples 1 to 11

To produce the moisture-curing compositions of Examples 1 to 4 and Comparative Examples 1 to 11, the following components were prepared (hereinbelow, the moisture-curing composition is simply referred to as a "composition").

Component (A): An Oligomer which has a Polymer of (Meth)Acrylic Monomers as a Main Chain and which has a Hydrolyzable Silyl Group in the Molecule Polyacrylic polymer (XMAP (registered trademark) OR110S, manufactured by KANEKA CORPORATION) having two trimethoxysilyl groups at both ends (In other words, having one trimethoxysilyl group at each end).

Component (B): Polydimethylsiloxane Represented by the General Formula 1

Non-modified polydimethylsiloxane (kinematic viscosity (25° C.): 100 mm$^2$/s) (KF96-100cs, manufactured by Shin-Etsu Chemical Co., Ltd.) (in the general formula 1, R$^1$=methyl group, R$^2$=methyl group)

Side chain type epoxy-modified polydimethylsiloxane (kinematic viscosity (25° C.): 1500 mm$^2$/s) (functional group equivalent: 350 g/mol) (KF-101, manufactured by Shin-Etsu Chemical Co., Ltd.) (in the general formula 1, R$^1$=methyl group, R$^2$=organic group having an epoxy group, with the proviso that R$^2$ at both ends is a methyl group).

Two-end type epoxy-modified polydimethylsiloxane (kinematic viscosity (25° C.): 15 mm$^2$/s) (functional group equivalent: 490 g/mol) (manufactured by KF-105 Shin-Etsu Chemical Co., Ltd.) (in the general formula 1, m=0, R$^1$=methyl group, and R$^2$=organic group having an epoxy group)

Component (B'): Polydimethylsiloxane Other than the Component (B)

Side chain type amine-modified polydimethylsiloxane (kinematic viscosity (25° C.): 110 mm$^2$/s) (functional group equivalent: 5000 g/mol) (KF-865, manufactured by Shin-Etsu Chemical Co., Ltd.)

Both ends type amine-modified polydimethylsiloxane (kinematic viscosity (25° C.): 90 mm²/s) (functional group equivalent: 2200 g/mol) (KF-8012, manufactured by Shin-Etsu Chemical Co., Ltd.)

Side chain type mercapto-modified polydimethylsiloxane (kinematic viscosity (25° C.): 200 mm²/s) (functional group equivalent: 1900 g/mol) (KF-2001, manufactured by Shin-Etsu Chemical Co., Ltd.)

Fumed silica treated with octylsilane (Aerosil 8805, manufactured by Nippon Aerosil Co., Ltd.)

The component (A), the component (B) (for Comparative Examples, the component (B')), the component (C), the component (E), and other components were weighted and then, to have homogeneousness, stirred for 1 hour with defoaming by using a stirrer. After that, the component (D) was added and stirred for 30 minutes with defoaming. Details about the preparation amount are as described in Table 1, and all the numerals are expressed in parts by mass.

TABLE 1

| Components | Raw materials | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Component (A) | OR110S | 100 | 100 | 100 | 100 | 100 | 100 | 100 | 100 |
| Component (B) | KF96-100cs | 20 | 20 | | | | 10 | 20 | 30 |
| | KF-101 | | | 20 | | | | | |
| | KF-105 | | | | 20 | | | | |
| Component (B') | KF-865 | | | | | | | | |
| | KF-8012 | | | | | | | | |
| | KF-2001 | | | | | | | | |
| | KF-99 | | | | | | | | |
| Component (C) | Ethyl silicate 40 | 1.0 | 2.5 | 1.0 | 1.0 | | | | |
| Component (D) | U-220H | 3 | 3 | 3 | 3 | 3 | 3 | 3 | 3 |
| Component (E) | KBM-903 | 5 | 5 | 5 | 5 | 5 | 5 | 5 | 5 |
| Others | KBM-13 | 5 | 5 | 5 | 5 | 5 | 5 | 5 | 5 |
| | 1800 | 50 | 50 | 50 | 50 | 50 | 50 | 50 | 50 |
| | R805 | 5 | 5 | 5 | 5 | 5 | 5 | 5 | 5 |
| Total | | 189.0 | 190.5 | 189.0 | 189.0 | 168.0 | 178.0 | 188.0 | 198.0 |

| Components | Raw materials | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|
| Component (A) | OR110S | 100 | 100 | 100 | 100 | 100 | 100 | 100 |
| Component (B) | KF96-100cs | 20 | 20 | 20 | | | | |
| | KF-101 | | | | | | | |
| | KF-105 | | | | | | | |
| Component (B') | KF-865 | | | | 20 | | | |
| | KF-8012 | | | | | 20 | | |
| | KF-2001 | | | | | | 20 | |
| | KF-99 | | | | | | | 20 |
| Component (C) | Ethyl silicate 40 | 0.3 | 5.5 | 10.0 | 1.0 | 1.0 | 1.0 | 1.0 |
| Component (D) | U-220H | 3 | 3 | 3 | 3 | 3 | 3 | 3 |
| Component (E) | KBM-903 | 5 | 5 | 5 | 5 | 5 | 5 | 5 |
| Others | KBM-13 | 5 | 5 | 5 | 5 | 5 | 5 | 5 |
| | 1800 | 50 | 50 | 50 | 50 | 50 | 50 | 50 |
| | R805 | 5 | 5 | 5 | 5 | 5 | 5 | 5 |
| Total | | 188.3 | 193.5 | 198.0 | 189.0 | 189.0 | 189.0 | 189.0 |

Side chain type hydrogen-modified polydimethylsiloxane (kinematic viscosity (25° C.): 20 mm²/s) (functional group equivalent: 60 g/mol) (KF-99, manufactured by Shin-Etsu Chemical Co., Ltd.)

Component (C): Silicate

Ethylpolysilicate (Ethyl silicate 40, manufactured by COLCOAT CO., Ltd) (in the general formula 2, n=5 and $R^1$=ethyl group)

Component (D): A Curing Catalyst

Dibutyl tin bisacetylacetonate (Neostan U-220H, manufactured by NITTO KASEI CO., LTD.)

Component (E): Silane-Based Coupling Agent Having an Amino Group

3-Aminopropyltrimethoxysilane (KBM-903, manufactured by Shin-Etsu Chemical Co., Ltd.)

Other Components

Methyltrimethoxysilane (KBM-13, manufactured by Shin-Etsu Chemical Co., Ltd.)

Calcium carbonate filler (Softon 1800, manufactured by BIHOKU FUNKA KOGYO CO., LTD.)

With regard to Examples 1 to 4 and Comparative Examples 1 to 11, thick film curing property determination (curing property determination at deep-section), Shore-A hardness measurement, tensile strength measurement, elongation rate measurement, tensile shear adhesion force measurement, foaming determination, and durability test were performed. The results are described in Table 2 and Table 3.

[Determination of Curing Property at Deep-Section]

After adding the composition to a vessel to the thickness of 5 mm or more, it was allowed to stand for 24 hours at 25° C. under 50% RH atmosphere. Then, the cured product was detached from the surface and thickness of the cured product was measured. The results are taken as "deep-section curing property (mm)". The curing property at deep-section is preferably 2.0 mm or higher. In Table 2, "Not cured" means no curing at all. "-" indicates that the measurement cannot be made due to foaming in the inside of a cured product.

TABLE 2

| Items for test | Example 1 | Example 2 | Example 3 | Example 4 | Comparative Example 1 | Comparative Example 2 | Comparative Example 3 | Comparative Example 4 |
|---|---|---|---|---|---|---|---|---|
| Deep-section curing property | 2.8 | 2.2 | 2.8 | 2.7 | 2.2 | 2.6 | 2.7 | 2.7 |

| Items for test | Comparative Example 5 | Comparative Example 6 | Comparative Example 7 | Comparative Example 8 | Comparative Example 9 | Comparative Example 10 | Comparative Example 11 |
|---|---|---|---|---|---|---|---|
| Deep-section curing property | 2.5 | 1.4 | 1.3 | 2.8 | 2.7 | Not cured | — |

[Measurement of Shore-A Hardness]

The composition was filled in a vessel with diameter 50 mm×height 5 mm, and by allowing it to stand for 7 days at 25° C. under 50% RH atmosphere, a cured product was produced. By completely pressing the hardness tester with pressure of 10 N using a durometer hardness tester (JIS-A), the maximum hardness value was measured as "hardness (without unit)" after. Details are based on JIS K 6249: 2003. When the composition is not cured or there is foaming in the inside of a cured product, it was expressed as "-" because the measurement cannot be made.

[Measurement of Tensile Strength and Measurement of Elongation Rate]

The composition was coated in a plate-shape with thickness of 2 mm, and by allowing it to stand for 7 days at 25° C. under 50% RH atmosphere, a cured product was produced. A test piece with dumbbell No. 5 shape was cut out from the cured product with plate-shape. With the distance of 25 mm between baselines, the test pieces was pulled at 500 mm/min by using a tensile tester and the distance between baselines when the test piece with dumbbell shape is fractured was measured, and then, the value of (Distance between baselines at fracture−Initial distance between baselines)/Initial distance between baselines×100, was calculated to measure the "elongation rate (%)." In addition, "tensile strength (MPa)" was calculated from the maximum dumbbell strength. Details are based on JIS K 6249: 2003. When the composition is not cured or there is foaming in the inside of a cured product, it was expressed as "-" because the measurement cannot be made.

[Measurement of Tensile Shear Adhesion Force]

By using an aluminum member (width 25 mm×length 100 mm×thickness 1 mm), two members were adhered and fixed to have an adhesion area of 10 mm×25 mm (clearance: 1 mm) with use of the composition. After allowing it to stand for 7 days at 25° C. under 506RH atmosphere, the composition was cured to produce a test piece. It was pulled at 50 mm/min by using a tensile tester, and from the maximum strength, the "tensile shear adhesion force (MPa)" was calculated. Details are based on JIS K 6249: 2003. When the composition is not cured or there is foaming in the inside of a cured product, it was expressed as "-" because the measurement cannot be made.

[Determination of Foaming]

The test piece for measurement of tensile shear adhesion force as described above was pulled to measure the tensile shear adhesion force. After that, the state of adhesion surface was visually observed to perform the determination. If there are foams on the adhesion surface, it was graded as "Yes". If there are no foams, it was graded as "No". The foams are believed to occur during curing, and in order not to lower the characteristics of the composition during adhesion or sealing, it is preferable to have no foams.

[Durability Test]

With regard to forming determination, Shore-A hardness measurement, tensile strength measurement, elongation rate measurement, and tensile shear adhesion force measurement, the initial measurement was carried out. A separate test piece was immersed in gear oil after the initial measurement, and it was allowed to stand for 240 hours at 160° C. After collecting the test piece, oil was removed from the test piece of which temperature is brought back to room temperature and the measurement was performed therefor. The results are summarized in terms of a change between the initial stage and after the test, and change rate. With regard to the foaming determination, if there is no foaming confirmed after the durability test, it was described as "○" while confirmed foaming was described as "x". Meanwhile, with regard to Shore-A hardness measurement, tensile strength measurement, elongation rate measurement, and tensile shear adhesion force measurement, calculation was made based on the formula of (Measurement value after durability test−Measurement value at initial stage)/Measurement value at initial stage×100 to have the "change rate (%)." The change rate is preferably within the range of ±100%. When the composition is not cured or there is foaming at the initial stage, it was expressed as "-" because the measurement cannot be made.

TABLE 3

| | Items for test | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Initial stage | Foaming | No | No | No | No | No | No | No | No |
| | Hardness | 28 | 20 | 43 | 30 | 25 | 23 | 19 | 13 |
| | Tensile strength | 1.6 | 1.3 | 1.7 | 1.8 | 1.7 | 1.3 | 1 | 1 |
| | Elongation rate | 252 | 248 | 188 | 224 | 316 | 312 | 304 | 320 |
| | Tensile shear adhesion force | 1.4 | 0.9 | 1.4 | 1.5 | 0.9 | 1.0 | 0.9 | 0.6 |
| After durability test | Foaming | No | No | No | No | Yes | Yes | Yes | Yes |
| | Hardness | 25 | 34 | 45 | 32 | 56 | 54 | 48 | 40 |
| | Tensile strength | 1.8 | 1.8 | 1.5 | 1.8 | 4.3 | 2.9 | 2.1 | 2 |

TABLE 3-continued

|  |  |  |  |  |  |  |  |  |  |
|---|---|---|---|---|---|---|---|---|---|
|  | Elongation rate | 224 | 140 | 268 | 336 | 136 | 144 | 150 | 176 |
|  | Tensile shear adhesion force | 2.0 | 1.6 | 2.3 | 2.5 | 2.2 | 2.0 | 1.6 | 1.1 |
| Change | Foaming | ○ | ○ | ○ | ○ | X | X | X | X |
| Change | Hardness | −11 | 70 | 5 | 7 | 124 | 135 | 153 | 208 |
| rate | Tensile strength | 13 | 39 | −12 | 0 | 153 | 123 | 110 | 100 |
|  | Elongation rate | −11 | −44 | 43 | 50 | −57 | −54 | −51 | −45 |
|  | Tensile shear adhesion force | 43 | 78 | 64 | 67 | 144 | 100 | 78 | 83 |

|  | Items for test | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|
| Initial stage | Foaming | No | No | No | No | No | — | Yes |
|  | Hardness | 17 | 25 | 30 | 23 | 20 | — | — |
|  | Tensile strength | 1.2 | 1.3 | 1.3 | 1.4 | 1.1 | — | — |
|  | Elongation rate | 292 | 230 | 190 | 264 | 292 | — | — |
|  | Tensile shear adhesion force | 0.8 | 0.8 | 0.8 | 1.4 | 1.2 | — | — |
| After durability test | Foaming | Yes | No | No | Yes | Yes | — | — |
|  | Hardness | 27 | 40 | 50 | 28 | 23 | — | — |
|  | Tensile strength | 2 | 1.7 | 1.8 | 2 | 1.3 | — | — |
|  | Elongation rate | 196 | 130 | 130 | 220 | 240 | — | — |
|  | Tensile shear adhesion force | 1.7 | 1.5 | 1.7 | 2.0 | 1.3 | — | — |
| Change | Foaming | X | ○ | ○ | X | X | — | — |
| Change | Hardness | 59 | 60 | 67 | 22 | 15 | — | — |
| rate | Tensile strength | 67 | 31 | 39 | 43 | 18 | — | — |
|  | Elongation rate | −33 | −44 | −32 | −17 | −18 | — | — |
|  | Tensile shear adhesion force | 113 | 88 | 113 | 43 | 8 | — | — |

When comparison is made between Examples 1 and 2 and Comparative Examples 6 and 7 in view of Table 2, there was a tendency that the curing property at deep-section is impaired as the component (C) is excessively high. Furthermore, although the component (C) was not added in Comparative Examples 1 to 4, from Table 3, it was found that the change rates (change rates of Shore-A hardness, tensile strength, elongation rate, and tensile shear adhesion force) are high when compared to Example. In Comparative Examples 1 to 5, 8 and 9, the foaming occurred in the inside of a cured product after the durability test so that there is a possibility of having cracking or fracture of a cured product. On the other hand, no foaming was confirmed from Examples 1 to 4. In addition, regarding the difference in physical properties of the composition which is observed from the comparison between Examples 1, 3, and 4 and Comparative Examples 8 to 11, although the clear reason remains unclear, it is believed that the difference is originated from a different type of the component (B). When Examples 1, 3, and 4 are compared to Comparative Examples 8 to 11, all except those corresponding to the component (B) among various polydimethylsiloxanes cannot be used since foaming is observed or no curing is yielded. From the above results, it was demonstrated that, by containing the component (B) together with a specific amount of the component (C), the curing property at deep-section can be ensured and the change rates of hardness, tensile strength, elongation rate, and tensile shear adhesion force can be suppressed to low level by the composition of the present invention. Furthermore, based on the comparison between Example 1 and Example 2, it was found that, when the component (C) is within the range of the present invention, a less amount of the component (C) can lead to a lower change rate value.

When the composition of the present invention is used for mounting in a vehicle, the member will experience high temperature. However, the composition is still required to follow a subject for adhesion. Thus, when it is used in such environment, the change rates of the hardness and elongation rate is particularly important among various change rates. Thus, from this point of view, it can be said that Examples 1, 3, and 4 are preferable.

INDUSTRIAL APPLICABILITY

For a sealing agent, use in an engine, a transmission, a differential gear, or the like in which both the heat resistance and oil resistance are required corresponds to use in harsh conditions. In addition, when cracking, fracture, expansion or the like occurs in a cured product, the sealing performance is deteriorated and it may develop into a serious problem. Regarding such problem, the present invention can provide a sealing agent which can be stably used even for such an important part.

The present application is based on Japanese Patent Application No. 2013-158801 filed on Jul. 31, 2013 and the disclosure is incorporated herein by reference in its entirety.

The invention claimed is:
1. A moisture-curing composition comprising the components (A) to (D), the moisture-curing composition comprising 0.5 to 5.0 parts by mass of the component (C) relative to 100 parts by mass of the component (A):
  Component (A): an oligomer which has a main chain formed from (meth)acrylic monomers and which has a hydrolyzable silyl group in the molecule,
  Component (B): polydialkylsiloxane of the following general formula 1,

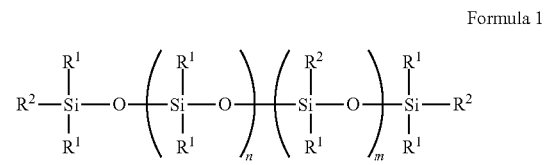

Formula 1

(n is an integer of 1 or more, m is an integer of 0 or more, $R^1$ each independently represents any one of a methyl group, an ethyl group, and a propyl group, and $R^2$ each independently represents $R^1$ or an organic group having an epoxy group)
  Component (C): silicate, and
  Component (D): a curing catalyst.

2. The moisture-curing composition according to claim 1, wherein the component (C) comprises the following general formula 2:

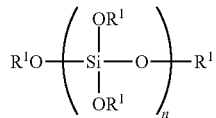
Formula 2

(n is an integer of 1 to 10 and $R^1$ each independently represents any one of a methyl group, an ethyl group, and a propyl group).

3. The moisture-curing composition according to claim 1, further comprising a silane-based coupling agent having an amino group as a component (E).

4. The moisture-curing composition according to claim 1, wherein the component (A) is an oligomer which has one hydrolyzable silyl group at each of the two ends of the main chain.

5. The moisture-curing composition according to claim 1, wherein the component (D) is an organo tin catalyst.

6. The moisture-curing composition according to claim 1, wherein the component (D) is an organo titanium catalyst.

7. An adhesive comprising the moisture-curing composition set forth in claim 1.

8. A sealing agent comprising the moisture-curing composition set forth in claim 1.

9. A potting agent comprising the moisture-curing composition set forth in claim 1.

10. The moisture-curing composition according to claim 1, wherein $R^2$ each independently represents $R^1$ in the formula 1, and the moisture-curing composition does not comprise a reactive polyorganosiloxane.

11. The moisture-curing composition according to claim 1, wherein $R^2$ each independently represents the organic group having the epoxy group in the formula 1.

* * * * *